Nov. 1, 1960   H. A. SPAFFORD   2,958,549
HOSE CLAMP
Filed July 31, 1958   2 Sheets-Sheet 1
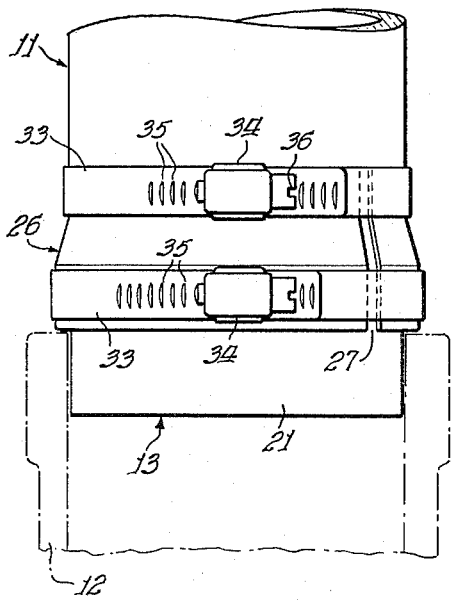
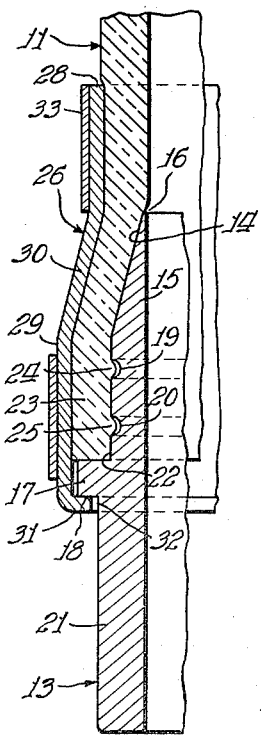
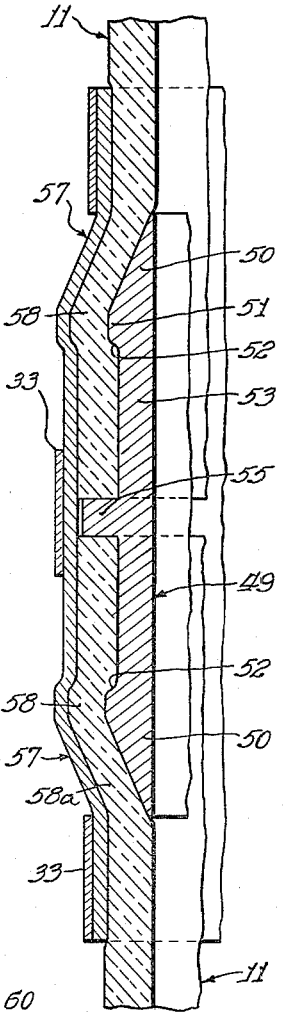
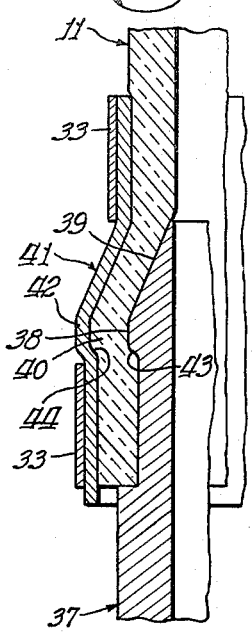
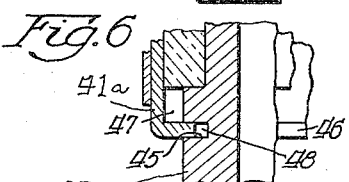
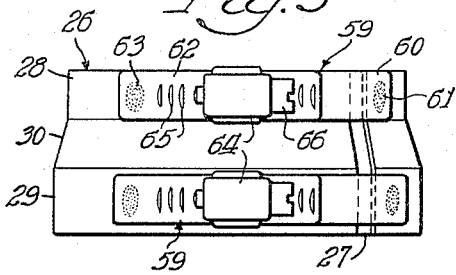
Inventor:
Hildreth A. Spafford
By: Jones, Tesch + Darbo
Attys.

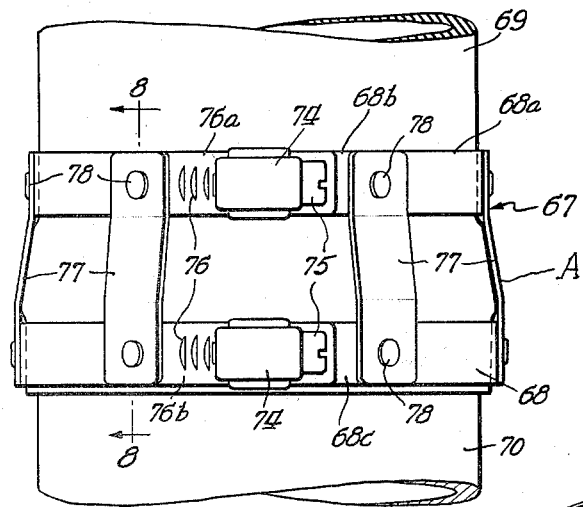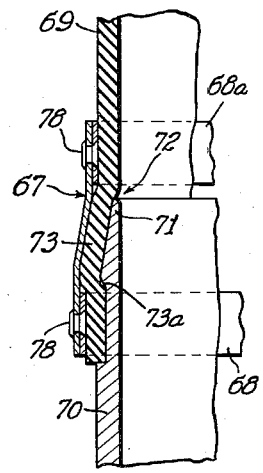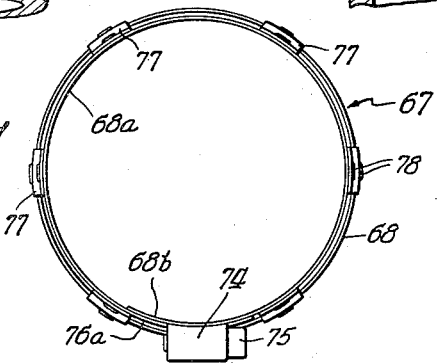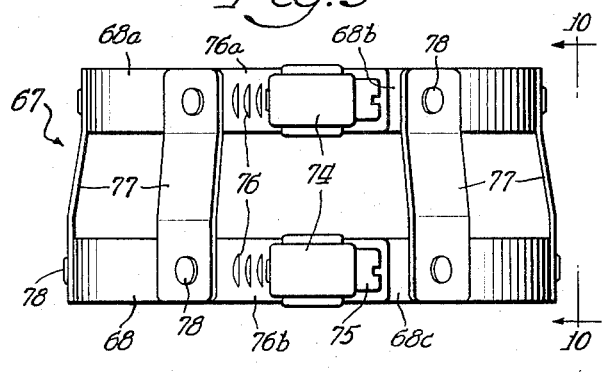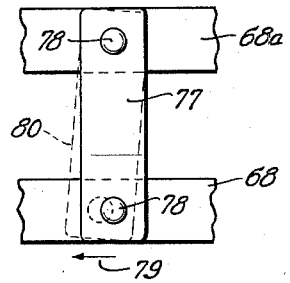

United States Patent Office 2,958,549
Patented Nov. 1, 1960

2,958,549

HOSE CLAMP

Hildreth A. Spafford, 1702 S. Lincoln Ave., Springfield, Ill.

Filed July 31, 1958, Ser. No. 752,379

2 Claims. (Cl. 285—243)

This invention relates to coupling means or the like such as for use with a nipple for a flexible hose or plastic pipe or with a connector for two adjacent lengths of such hose or pipe.

In an important aspect, the present invention provides an improved unitary clamping sleeve that may be readily produced in large quantities at minimum cost which by graduation of its diameter accommodates a taper given to the pipe to provide a somewhat flush and continuous inner periphery between the pipe and a nipple or connector and to effect a secure but releasable interlock therewith.

A further object is to provide such a clamping sleeve having a single split therein for expansion and contraction for accommodation to the taper of the pipe on the nipple or other connector and having integral axially spaced apart clamping devices carried thereby.

Still another object is the provision of such a clamping sleeve, which, in one aspect of the invention, is provided with an interior peripheral channel to accommodate an annular peripheral bead imposed upon the plastic pipe by a similar bead on the exterior surface of the nipple or connector.

Still another object is the provision of such a clamping sleeve having an internal flange which cooperates with a shoulder on or groove in the nipple or connector, for anchoring the clamping sleeve axially with respect thereto.

One useful application of the invention is that of providing a metallic nipple for the end of a flexible pipe that constitutes a sewage disposal conduit for an automobile house trailer for example, the nipple being readily insertable into a sewer pipe and loosely but securely maintaining the end of the flexible pipe in disposable relation with the sewer pipe.

Another useful application is that of providing a clamping sleeve for each end of a connector coupling for a pair of sections of such sewage disposal pipes or any other hose or pipe sections that may be employed as conduit means for many varied purposes.

Other objects and advantages will be apparent from the following description, taken together with the accompanying drawing, of illustrative embodiments of the invention, and in which drawings—

Figure 1 shows the terminal end of a flexible sewage disposal pipe led into a ground sewer pipe by means of the present invention, the sewer pipe being shown in broken lines;

Figure 2 is a half section, somewhat enlarged, through a wall of the structure shown in Fig. 1;

Figure 3 is a view similar to Fig. 2 but showing a modification of the invention;

Figure 4 shows the application of the invention to a coupling connector;

Figure 5 is a separate view of one form of unitary clamping sleeve and contracting bands;

Figure 6 shows a further modification;

Figure 7 shows a modified form of unitary clamping sleeve in the form of an integral flexible device;

Figure 8 is a half section on the line 8—8 of Fig. 7;

Figure 9 is a separate view of the clamping sleeve of Fig. 8;

Figure 10 is a view on the line 10—10 of Fig. 9, illustrating flexibility; and

Figure 11 is a somewhat reduced plan view of the form of clamping sleeve shown in Figs. 7 to 10.

Referring in detail to the illustrative construction as shown in the drawings, and, turning first to Figs. 1 and 2, there is here shown a flexible plastic pipe or rubber hose 11 which, as already alluded to, may constitute the sewage disposal conduit, the discharge end of which here shown is desired to be led to the permanent ground sewer pipe shown in dotted lines at 12.

In accordance with the present invention, I provide in this instance the nipple 13 preferably of metal that has on its outer terminal surface a taper 14 that intersects the internal surface 15 thereof, forming at said intersection a relatively sharp annular edge 16. Intermediate its length the nipple 13 has an external annular enlargement 17 that provides a downwardly facing shoulder 18 for a purpose presently pointed out. Between the tapered surface 14 of the nipple and the annular enlargement 17 the nipple advantageously is circumferentially grooved as in this instance in a pair of axially spaced apart locations as at 19 and 20. Below the shoulder 18 the nipple has the cylindrical foot 21 of uniform diameter, while above the enlargement 17 the diameter is somewhat reduced as at 22, in which diameter the grooves 19 and 20 occur and which is uniform to a point above these grooves where the taper 14 begins.

The disposal or terminal end 23 of the pipe 11 is forced onto the tapered end 14 of the nipple 13 and is thereby expanded, the pipe 11 being of suitable elastomeric material which permits such expansion for riding onto the cylindrical surface 22, over the grooves 19 and 20, and into abutment with the annular enlargement 17 of the nipple on the upper side thereof. Some desirable locking action occurs between the pipe end 23 and the grooves 19 and 20 since the material of the pipe can flow slightly into these grooves as at 24 and 25 thus providing an interlock and relatively securely attaching the pipe to the nipple. The nipple enlargement 17 is desirably of an over-all diameter slightly less than that of the pipe end 23, as expanded.

For further securement of the pipe to the nipple, and further in accordance with the present invention, I employ my novel clamping sleeve 26 that is advantageously shell-like of relatively thin section spring metal and in the form of a broken annulus having a single split at 27. The clamping sleeve 26 is of varying or graduated diameter having an upper cylindrical end 28 of relatively small diameter, the lower cylindrical end 29 of relatively large diameter, and an intermediate portion 30 of frustoconical form. At its lower end the clamping sleeve 26 in this instance has an inturned flange 31 that provides a gripping edge for the clamping sleeve when the sleeve is compressed about the flexible pipe and nipple as next described.

To locate the clamping sleeve 26 in position it is first placed on the pipe 11 before the latter is expanded as at 23 onto the nipple portion 22, and, after that has been done, as already described, the clamping sleeve 26 is moved downwardly over the pipe expanded end 23 as here shown, over the nipple enlargement 17, the split 27 of the clamping sleeve permitting this to be done, and then the clamping sleeve flange 31 is locked or hooked onto the nipple enlargement 17 as best seen in Fig. 2. Thereupon clamping means are provided for contracting the clamping sleeve 26 about the pipe end 23 and nipple enlargement 17. For this purpose the flange 31 is sufficiently short so as, when the clamping sleeve is in fully clamped position, to leave a space 32 between the flange 31 and the nipple end 21 to allow for maximum desired contraction of the clamping sleeve.

For effecting the contraction of the clamping sleeve, I may conveniently use the well-known spring clamping bands 33 as shown in Fig. 1 for example that are provided with the worm-screw devices 34 on one end of the bands that engage with the slot 35 at the other end of the bands to tighten or loosen the bands as desired by insertion of a screw driver in the kerf 36 of the screw of the worm screw device 34. As here shown I desirably employ two of the bands 33, one about the smaller end 28 of the clamping sleeve 26 and another about the larger end 29 of the clamping sleeve. It will be understood that as the sleeve is contracted the slit or split 27 therein is reduced in width correspondingly.

It will be also understood that the end of the foot portion 21 of the nipple portion 13 may be varied in length as desired.

So constructed and arranged, a substantially flush internal joint is provided by termination 16 at the upper end of the nipple within the pipe 11 so as to avoid a shoulder at that point which might interfere with the passage of material down through the pipe. Thus any objectionable lodgment of such material thereat is eliminated. At the same time, an enhanced securement of the plastic pipe 11 to the nipple 13 is obtained that makes separation of these parts in service practically impossible unless that be desired to be accomplished by unscrewing the worm-screw devices 34 for loosening the clamping sleeve 26.

In the modification shown in Fig. 3 the nipple 37 is generally similar to the nipple 13 but, instead of having the circumferential grooves 19 and 20 therein, is formed with the external circumferential bead 38 at the larger end of the tapered surface 39. In conforming to the nipple 37 the plastic pipe 11 is distorted to accommodate the annular bead 38 on the nipple and provide an interlock between the nipple and the lower end of the plastic pipe by the offset 40 in the latter. To accommodate the offset 40, the clamping sleeve 41, somewhat similar to the clamping sleeve 26, has an annularly offset portion 42. Thus an internal shoulder 43 is provided between the plastic pipe and the nipple and an internal shoulder 44 between the plastic pipe and the clamping sleeve 41, that further guard against movement of the pipe upwardly on the nipple. In this modification, the nipple 37 omits the enlargement 17 shown on the nipple 13, and the clamping sleeve 41 omits the flange 31 of the clamping sleeve 26. The clamping bands 33 are used in the Fig. 3 modification similarly as with the Figs. 1 and 2 form.

In the utilization shown in Fig. 4, the connector or coupling 49 is double ended having integral portions at each end corresponding somewhat to the nipples 13 and 37 in the respect that at each end there is a tapered portion 50 terminating in a bead 51 that provides a shoulder 52 between the portion 53 of the nipple and each tapered portion, the portion 53 being of reduced diameter. The central portion of the latter carries an annular enlargement 55 that provides an abutment for the expanded separate pipe ends 58a of adjoining sections of pipe 11 thus providing a connector coupling for such pipe sections. The pipe ends 58a have the shoulders 58 expressed therein. The shoulders 52 desirably face each other to enhance the interlock. A double ended clamping shell 57 is here shown with which may be employed a clamping band 33 at each end and a single central band 33. The double ended clamping shell 57 is similar to two of the sleeves 41 formed as a unit having a continuous split such as 27 of the sleeve 26 therein. This split permits the sleeve 57 to be expanded over the shoulders 58.

Figure 5 shows the clamping sleeve 26 separately and in one form in which it may be unitarily supplied for users of coupling means such as are here described. To further provide a unitary article with tightening devices integral therewith, I have shown the straps 59 permanently attached thereto. For this purpose each strap 59 includes a strap end 60 of relatively short length that is spot welded as at 61 to the clamping sleeve 59 at one side of the slit 27 and another strap end 62 that is spot welded as at 63 to the clamping sleeve 59 on the opposite side of the slit 27, one of these ends, in this instance the end 60, carrying the worm-screw device 64, and the other end, in this instance the end 62, having therein the slots 65 that cooperate with the screws of the worm-screw 66.

Figure 6 shows a modification of Figure 3 in which the clamping sleeve 41a has an internal flange 46 that is received in an annular groove 45 in the nipple 37a the groove 45 being of sufficient depth to leave a space 48 at the bottom thereof to insure maximum clamping action, together with space 47.

Figs. 7 to 11 show the form of the device in which the clamping sleeve comprises a pair of flexible overlapping contractible bands having strap ends carrying worm screw tightening devices including slots in one of the strap ends respectively therefor. The bands, shown of different predetermined diameters, are connected by axially extending connector members, also of strip material, which are flexibly attached to the bands so as to provide flexible adjustability not only of the bands themselves but also of the clamping sleeve as a whole constituted by the bands and the connecting members.

Specifically, flexible band 68a of the unitary flexible clamping device 67 is of a predetermined average diameter smaller than the predetermined average diameter of the companion band 68 of the same device, the purpose of this being, similarly to the operation previously described, of contracting the rubber hose 69 onto the metal nipple 70, the latter having a tapered end 71 which enters the hose 69 and so that a flush surface is provided at 72 between the hose pipe and the nipple on their interior surfaces, the end 73 of the hose pipe being held by the band 68 to the nipple periphery and onto a shoulder 73a thereof.

Each band 68a and 68, on one strap end thereof respectively as at 68b and 68c, carries a worm screw bearing 74 in which is a worm screw 75 that meshes with the transverse slots 76 in the other strap ends 76a and 76b of the bands 68a and 68 respectively, and by which the bands may be individually tightened.

Further following this aspect of the invention, the bands 68a and 68 are not only inherently flexible of themselves but are connected by flexible connector strips 77, of which there are in this instance six, distributed uniformly about the perimeters of the bands and connected to the bands respectively by rivets 78 on which some play is possible. As seen in the drawings, the connector strips jointly taper, which is to say, each connector strip has an intermediate portion A that slants or extends obliquely to the common axis of the device 67 to conform to the differing normal diameters of the bands.

As best seen in Fig. 10 some relative flexible adjustability of the bands 68a and 68 is permitted such as, for example, where relative movement of the band 68 with respect to the band 68a in the direction of the arrow 79 on the riveted connections 78 so that the connector 77 may if necessary assume a somewhat oblique condition as 80.

This application is a continuation in part of my prior application Serial No. 608,355 filed September 6, 1956, and now abandoned.

What is here claimed is:

1. Coupling means of the class described, comprising a nipple having a bore therethrough, a tapered extremity and an exterior annular recess back of said tapered extremity, said extremity tapering to a sharp annular edge, a flexible hose pipe having a normal internal diameter substantially equal to the diameter of said bore into which the nipple is entered so that the hose pipe is expanded thereover and the end of the pipe is received in the annular recess in the nipple, a split ring clamping member providing a pair of wide clamping band portions of unequal diameter, the larger of said band portions encircling the pipe in the region of said annular recess and the smaller band portion encircling the pipe in the region of the tapered end of the nipple, said smaller band portion being positioned axially beyond said sharp annular edge of said nipple, the hose being unsupported beneath said extending part whereby to compress the pipe on the sharp annular edge of the nipple to avoid an internal shoulder thereat, said clamping member having a tapered intermediate portion corresponding to the difference in diameters of the band portions, the inner profile of said clamping member being substantially complementary to the outer profile of said nipple, and a worm screw adjustable tightener device associated with each said band portion, said tightener devices being independently adjustable.

2. Coupling means of the class described, comprising a nipple having a bore therethrough and a tapered extremity, said extremity tapering to a sharp annular edge, a flexible hose pipe having a normal inside diameter substantially equal to the diameter of said bore into which the nipple is entered so that the hose pipe is expanded thereover and said edge is substantially flush with the inside of the pipe, a split ring clamping member providing a pair of clamping band portions of unequal diameter, the larger of said band portions encircling the pipe where the pipe is expanded over the nipple and the smaller band portion encircling the pipe in the region of the tapered end of the nipple, said smaller band portion being positioned axially beyond said sharp annular edge of said nipple, the hose being unsupported beneath said extending part whereby to compress the pipe on the sharp annular edge of the nipple to avoid an internal shoulder thereat, and an adjustable tightener device operatively associated with each said band portion.

References Cited in the file of this patent

UNITED STATES PATENTS

| | | |
|---|---|---|
| 314,066 | Sergeant | Mar. 17, 1885 |
| 393,400 | Sharpneck | Nov. 27, 1888 |
| 638,823 | Vander Stel | Dec. 12, 1899 |
| 835,300 | Clark | Nov. 6, 1906 |
| 992,426 | James | May 16, 1911 |
| 1,073,850 | Greer | Sept. 23, 1913 |
| 1,101,844 | Gething | June 30, 1914 |
| 1,411,930 | Peterson | Apr. 4, 1922 |
| 2,269,286 | Ott | Jan. 6, 1942 |
| 2,704,675 | Henderson | Mar. 22, 1955 |

FOREIGN PATENTS

| | | |
|---|---|---|
| 344,935 | Great Britain | Sept. 12, 1930 |
| 819,454 | Germany | Oct. 31, 1951 |